US008616023B2

(12) United States Patent
Grzybowski et al.

(10) Patent No.: US 8,616,023 B2
(45) Date of Patent: Dec. 31, 2013

(54) RAISED FEATURES ON TRANSPARENT SUBSTRATES AND RELATED METHODS

(75) Inventors: Richard Robert Grzybowski, Corning, NY (US); Stephan Lvovich Logunov, Corning, NY (US); Alexander Mikhailovich Streltsov, Corning, NY (US)

(73) Assignee: Corning Incorporated, Corning, NY (US)

( * ) Notice: Subject to any disclaimer, the term of this patent is extended or adjusted under 35 U.S.C. 154(b) by 388 days.

(21) Appl. No.: 12/990,239

(22) PCT Filed: May 1, 2009

(86) PCT No.: PCT/US2009/002717
§ 371 (c)(1),
(2), (4) Date: Oct. 29, 2010

(87) PCT Pub. No.: WO2009/151513
PCT Pub. Date: Dec. 17, 2009

(65) Prior Publication Data
US 2011/0039072 A1 Feb. 17, 2011

Related U.S. Application Data

(60) Provisional application No. 61/126,094, filed on May 1, 2008.

(51) Int. Cl.
*C03B 23/02* (2006.01)
(52) U.S. Cl.
USPC ............... 65/102; 65/33.2; 65/103; 65/106; 65/93

(58) Field of Classification Search
USPC ............ 427/540; 264/1, 37, 482; 65/25.4, 31, 65/33.2, 93–94, 103
See application file for complete search history.

(56) References Cited

U.S. PATENT DOCUMENTS

| 3,561,963 A | 2/1971 | Kiba ............................ 96/36.2 |
| 2007/0201797 A1* | 8/2007 | Grzybowski et al. ........... 385/52 |
| 2009/0291261 A1* | 11/2009 | Hidaka et al. ................. 428/156 |
| 2011/0100058 A1* | 5/2011 | Dickinson et al. ............. 65/104 |

OTHER PUBLICATIONS

Tamaki, T., Watanabe, W., Itoh, K., Laser Micro-Welding of Transparent Materials by a Localized Heat Accumulation Effect Using a Femtosecond Fiber Laster at 1558 nm, Optics Express, vol. 14, No. 22, pp. 10468-10476, (Oct. 30, 2006).
Walser, A., Demos, S., Etienne, M., Dorsinville, R., Non-Linear Optical Absorption in Laser Modified Regions of Fused Silica Substrates, Elsevier, Optics Communications 240, pp. 417-421, (2004).
Rudolph, et al., "Excimer laser-induced material modification to create nanometer high smooth patterns in glass using mask projection", Journal of Physics: Conference Series 59, (2007), pp. 169-172.

(Continued)

*Primary Examiner* — Jodi C Franklin
(74) *Attorney, Agent, or Firm* — Michael W. Russell

(57) ABSTRACT

Raised features are formed on a transparent substrate having absorption of less than about 20% within a processing wavelength range. A portion of the substrate is irradiated with a light beam to increase the absorption of the irradiated portion of the substrate. Continued irradiation causes local heating and expansion of the substrate so as to form a raised feature on the substrate surface.

16 Claims, 4 Drawing Sheets

(56) References Cited

OTHER PUBLICATIONS

Shimotsuma, et al., "Three-Dimensional Micro- and Nano-Fabrication in Transparent Materials by Femtosecond Laser", Japanese Journal of Applied Physics, vol. 44, No. 7A, (2005), pp. 4735-4748.

Efimov, et al., "Color-centered generation in silicate glasses exposed to infrared femtosecond pulses", Optical Society of America, vol. 15, No. 1., (1998), pp. 193-199.

* cited by examiner

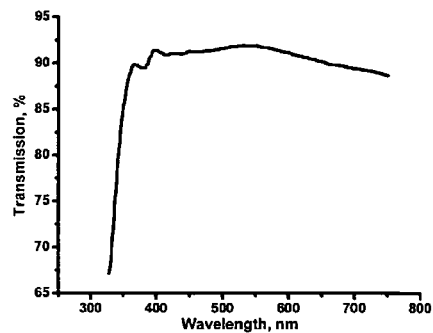
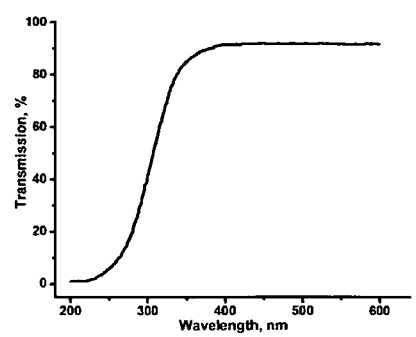
FIG. 1A
FIG. 1B
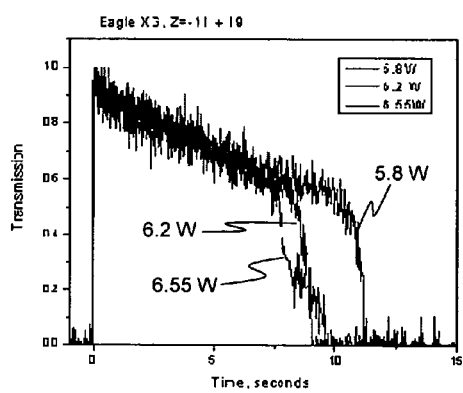
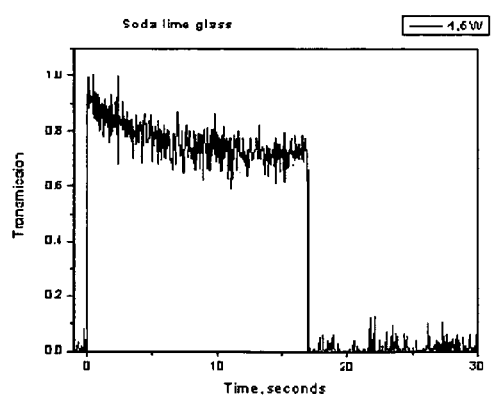
FIG. 4A
FIG. 4B

RAISED FEATURES ON TRANSPARENT SUBSTRATES AND RELATED METHODS

PRIORITY

This application claims priority to U.S. Provisional Patent Application No. 61/126,094, filed May 1, 2008, titled "RAISED FEATURES ON TRANSPARENT SUBSTRATES AND RELATED METHODS".

FIELD

The present invention relates generally to surface texturing of glass materials, and specifically to surface texturing of transparent glass materials induced by locally applied energy. Such texturing may include making bumps, ridges, and all variety of more complex surface features resulting from combinations of these.

BACKGROUND

The effect of glass swelling when locally irradiated with a laser is known. The effect is based on absorption of high-power laser radiation such that the glass melts and flows to form a bump on the glass surface. Glasses having sufficient absorption at the wavelengths of available high-power lasers are typically dark or otherwise opaque in the visible spectrum (i.e., in the range from about 380 nm to about 750 nm). The use of dark or opaque glasses poses a significant obstacle for applications that require clear glass for better visibility and transparency. Available transparent glasses, however, have very little absorption at wavelengths where high-power lasers are available. These wavelengths include the near-infrared (NIR) band between 800 µm and 1600 µm, where a good selection of pigtailed diode lasers and fiber lasers is available, or in the UV band. $CO_2$ lasers emitting 10.6 µm radiation are generally not applicable because the absorption depth of oxide glasses at this wavelength is on the order of the wavelength. It would be desirable, however, to be able to form raised features on transparent glasses.

SUMMARY

One aspect of the invention is a method for forming a raised feature on a transparent substrate. In one embodiment, the method comprising the steps of providing a transparent substrate having a surface, the substrate having an absorption of less than about 20% within a processing wavelength range; irradiating a portion of the transparent substrate with a processing light beam within the processing wavelength range to increase the absorption of the irradiated portion of the substrate in the processing wavelength range; continuing to irradiate the portion of the transparent substrate within the processing wavelength range to cause local heating and expansion of the substrate so as to form a raised feature on the substrate surface; and terminating the irradiation to stop heating of the substrate so as to fix the raised feature.

In another embodiment, the method comprises the steps of providing a transparent substrate having a surface, the substrate having an absorption of less than about 20% within a first wavelength range; irradiating a portion of the transparent substrate with light within the first wavelength range to increase absorption within the irradiated portion of the transparent substrate to greater than about 40% within a second wavelength range; irradiating the portion of the transparent substrate with light within the second wavelength range to cause local heating and expansion of the substrate so as to form a raised feature on the substrate surface; and terminating the irradiating to stop heating of the substrate so as to fix the raised feature.

Another aspect of the invention is an article of transparent glass with a surface having one or more raised features formed thereon by glass expansion of the substrate due to locally irradiating the substrate in corresponding one or more locations.

Additional features will be set forth in the description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description present embodiments according to the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments according to the invention and together with the description serve to explain the principles and operations of the invention.

BRIEF DESCRIPTION OF THE DRAWINGS

FIGS. 1A and 1B illustrate typical transmission curves in the UV and visible wavelength spectrums for transparent alkaline earth aluminosilicate glasses (FIG. 1A) and transparent soda lime glasses (FIG. 1B).

FIGS. 4A and 4B illustrate the dynamic transmission change for 355 nm radiation in alkaline earth aluminosilicate glasses (FIG. 4A) and soda lime glasses (FIG. 4B).

DETAILED DESCRIPTION

Figure 2:
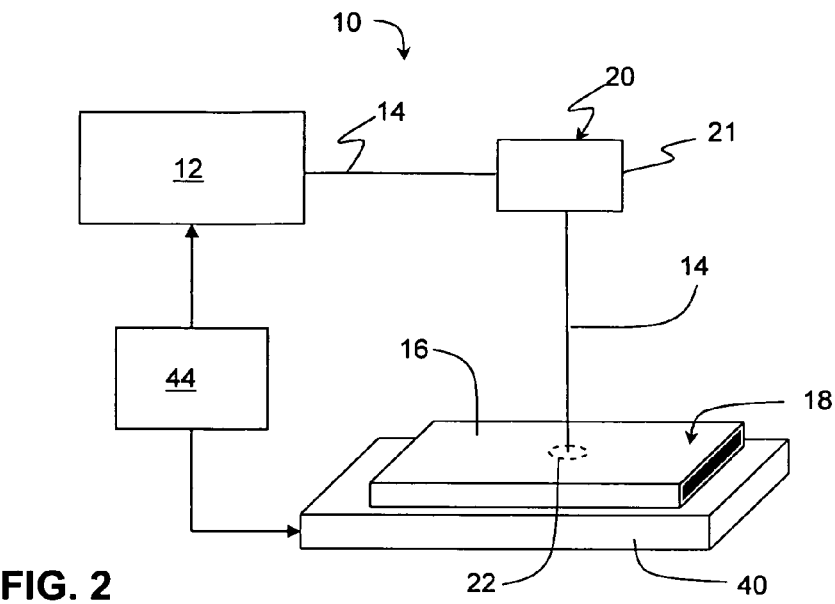
FIG. 2 is a schematic illustration of one embodiment of an exemplary system for forming raised features on a transparent substrate according to the invention.

Reference will now be made in detail to embodiments according to the invention, examples of which are illustrated in the accompanying drawings. Whenever possible, the same reference numerals will be used throughout the drawings to refer to the same or like parts.

For purposes of description herein, the terms "upper," "lower," "right," "left," "rear," "front," "vertical," "horizontal," and derivatives thereof relate to the illustrated embodiments as oriented in the figures. However, it is to be understood that the embodiments may assume various alternative orientations and step sequences, except where expressly specified to the contrary. It is also to be understood that the specific devices and processes illustrated in the attached drawings and described in the following specification are embodiments of the inventive concepts defined in the appended claims. Hence, specific dimensions and other physical characteristics relating to the embodiments disclosed herein are not to be considered as limiting, unless the claims expressly state otherwise.

The term "light" is broadly understood to mean any type of electromagnetic radiation, including but not limited to ultra-violet, near ultra-violet, visible, near-infrared and infrared wavelengths.

The term "light-absorbing substrate" is understood to mean a substrate or portion of a substrate that absorbs light at an absorption wavelength or range of wavelengths, including but not limited to ultra-violet, near ultra-violet, visible, near-infrared and/or infrared wavelengths, wherein local absorption of the light by the substrate at one or more of the absorption wavelengths locally heats the substrate. A light-absorbing substrate may have bands of high and low absorption across the wavelength spectrum.

The terms "transparent substrate" and "clear substrate" are understood to mean a substrate that transmits light in a range of wavelengths that includes all or at least a portion of the visible spectrum (i.e., in the range from about 380 nm to about 750 nm).

The term "raised feature" is broadly understood to include any raised feature on the surface of a substrate caused by local heating and swelling of the substrate, including bumps, ridges, and all variety of more complex surface features resulting from combinations of bumps and ridges.

The term "photo-induced absorption" is broadly understood to mean a change of the absorption spectrum of the substrate at resulting from irradiation of the substrate. Photo-induced absorption may involve a change in absorption at a wavelength or range of wavelengths, including but not limited to ultra-violet, near ultra-violet, visible, near-infrared and/or infrared wavelengths. Examples of photo-induced absorption in a transparent glass substrate include, for example and without limitation, color centers formation, transient glass defects formation, and permanent glass defects formation.

The formation of micro-bumps on glass substrates using high-power lasers, where the substrates are absorbing at the irradiating wavelength, has been set forth, for example, in U.S. Patent Publication No. US 2007/0201797 published Aug. 30, 2007, and entitled GLASS-BASED MICROPOSITION SYSTEMS AND METHODS which is hereby incorporated by reference herein in its entirety. However, as noted above, glass substrates having sufficient absorption at the wavelengths of available high-power lasers are typically dark or otherwise opaque in the visible spectrum (i.e., in the range from about 380 nm to about 750 nm).

Available transparent glasses have very little absorption at wavelengths where high-power lasers are available, such as the near-infrared (NIR) band between about 800 μm and 1600 μm, or in the UV band operating between about 340 nm and about 380 nm). For example, alkaline earth aluminosilicate glasses and sodium aluminosilicate glasses (e.g., glass such as Eagle$^{2000}$® glass, EagleXG™ glass, 1317 glass and Gorilla™ glass, available from Corning Incorporated) typically have a transmission spectra as shown in FIG. 1A, and soda lime glass (e.g., window glass) typically has a transmission spectra as shown in FIG. 1B. As evident from FIGS. 1A and 1B, the transmission of alkaline earth aluminosilicate and soda-lime glasses is more than about 85% at 355 nm (as provided, for example, by a 3rd harmonic Nd-based laser operating at 355 nm), which is insufficient for heating even small volumes of glass to temperatures close to a working point (~105 poise) unless lasers with several-hundred watts of available output power are used.

Unexpectedly, for transparent substrates including alkaline earth aluminosilicate glasses (e.g., LCD glasses such as Eagle$^{2000}$® glass and EagleXG™ glass available from Corning Incorporated), soda-lime glasses (e.g. window glass), and sodium aluminosilicate glasses (e.g., 1317 glass and Gorilla™ glass available from Corning Incorporated), it has been found that absorption at wavelengths of interest (i.e., those wavelengths where high-power lasers are available) can be raised to a sufficient level by focusing the output of a high repetition-rate, nanosecond, UV laser onto the transparent substrate. In particular, several seconds of exposure have been found to result in photo-induced absorption of the transparent glass substrate. Hence, the glass substrate absorption significantly increases at the UV wavelength, thereby making it possible to heat the glass substrate to its working temperature and cause the formation of raised features on the surface of the substrate.

Figure 3:
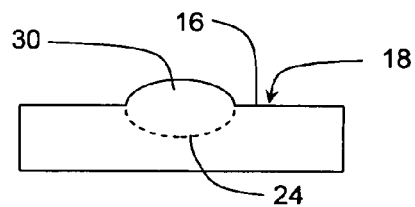
FIG. 3 is a schematic illustration of an individual raised feature on a transparent substrate formed according to the invention.

Referring now to FIG. 2, an exemplary fabrication system 10 for forming raised features according to the invention is schematically illustrated. Fabrication system 10 includes a processing light source 12 for producing a processing light beam 14. Processing light beam 14 is directed from source 12 to a substrate 18 having a surface 16. Surface 16 is the surface at which at least one raised feature 30 is to be formed (FIG. 3). Substrate 18 comprises a transparent substrate. In one embodiment, processing light beam 14 is directed to substrate 18 by an optical system 20. In one embodiment, the processing light beam 14 produced by source 12 is a UV laser.

In one embodiment, optical system 20 includes a scanner 21 for directing beam 14 to selected areas of substrate 18. Scanner 21 enables, for example, the writing of various patterns on the substrate surface. Similar results may be achieved by fixing the position of beam 14 and maneuvering the substrate 18 using motorized stages, as illustrated in FIG. 2. For example, a positioning mechanism 40, such as an X-Y stage, can be used to locate substrate 18 at a desired position relative to processing light beam 14. If desired, positioning mechanism 40 may also include a Z-axis stage for controlling the size of beam spot 22 and, hence, the diameter of raised feature 30. A suitable controller 44 is provided for operating positioning mechanism 40 and, optionally, also processing light source 12.

Figure 5:
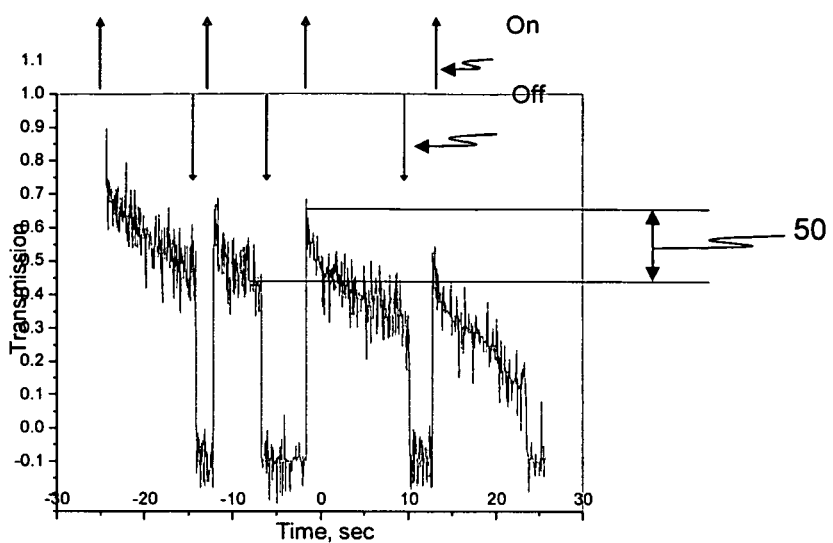
FIG. 5 illustrates formation and decay of photo-induced absorption in a transparent substrate.

The process of photo-induced absorption and the resulting transmission changes in a transparent glass substrate exposed to laser radiation can be observed using the system 10 of FIG. 2. A 3rd harmonic Nd-based UV laser operating at 355 nm and having a repetition rate of about 50 kHz was focused at the substrate 18 using a lens having a focal distance of 150 mm. A power meter was placed behind the substrate to monitor the transmission dynamics of the substrate. The transmission results for Eagle XG™ glass and soda lime glass are shown in FIGS. 4A and 4B, respectively, where it is clearly seen that transmission of 355 nm radiation decreases as a function of exposure time (i.e., absorption increases as a function of time). FIG. 4A further shows that increasing laser power speeds the decrease in transmission. When transmission drops to about 50%, bump formation starts, and then the measured transmission suddenly drops due to refraction of light in the resulting bump. The rate of transmission drop due to photo-induced absorption depends on the power level of the irradiating laser, with higher power lasers requiring a shorter time to cause photo-induced absorption in the substrate. In one embodiment, the photo-induced absorption is unstable and decays with time. As illustrated in FIG. 5, when the laser is turned off the level of transmission rises, as indicated at reference number 50.

Photo-induced absorption results from elements in the glass that create defects in the glass or change their oxidation state upon irradiation by a laser of the appropriate wavelength. For example, ions in the transparent substrate may change their oxidation state, thereby resulting in a change of the absorption spectrum of the substrate at the irradiated location. In one embodiment of the process described above and illustrated by the graphs of FIGS. 4A, 4B and 5, the photo-induced absorption resulting from UV irradiation causes an increase in absorption in the same UV spectrum (i.e., the transparent substrate develops a "color" in the UV spectrum). Thus, in one embodiment, the formation of raised features is implemented as a single-step process where a single laser is used to generate photo-induced absorption and locally heat the glass for raised feature growth. In another embodiment, the process is implemented as a multiple-step process where the photo-induced absorption is generated by irradiation with a first laser source having a first wavelength range, and results in an increase in absorption in a second wavelength range. A second laser source operating at the second wavelength range is then used to heat the substrate and form the raised features. In one embodiment, the first and second wavelength ranges are separate and distinct wavelength ranges. In another embodiment, the first and second wavelength ranges completely or partially overlap. Steps in a multi-step process may be separated in time, depending on the temporal nature of the photo-induced absorption. In one embodiment, a UV lamp and a mask are used to cause photo-induced absorption. With continued irradiation at the wavelength of increased absorption (e.g., UV in one embodiment), light energy is absorbed by substrate 18 at the irradiated location (defined by beam spot 22) and causes localized heating of substrate 18.

In one embodiment, the photo-induced absorption does not increase absorption in all or a portion of the visible wavelength spectrum. In one embodiment, the photo-induced absorption results from irradiating and thereby changing the oxidation states of ions that do not absorb in all or a portion of the visible wavelength spectrum. The transparent substrate includes at least one constituent capable of causing photo-induced absorption when subject to laser irradiation. In one embodiment, at least one of antimony (Sb), arsenic (As), tin (Sn), iron (Fe), cerium (Ce), lead (Pb), transition metals (e.g., titanium (Ti), copper (Cu), and others) and/or their oxides are present in the transparent substrate and participate in the photo-induced absorption of the transparent substrate.

The local absorption of light from processing light beam 14 by substrate 18 locally heats substrate 18 and raises the temperature of the irradiated portion of substrate 18 in proportion to the intensity of processing light beam 14. As processing light beam 14 is locally absorbed by substrate 18, a limited expansion zone 24 (FIG. 3) is created within which the temperature increase causes melting and a decrease in the density of substrate 18. Since expansion zone 24 is constrained by solid regions of substrate 18 surrounding expansion zone 24, the melted material within expansion zone 24 is pushed to flow toward surface 16, thereby forming raised feature 30 (e.g., a bump) on surface 16. The raised feature 30 is fixed by rapid cooling. In an example embodiment, this is accomplished by terminating the irradiation of substrate 18 by processing light beam 14.

More complicated raised features, such as lines, ridges, or other complicated raised structures, can be formed by translating beam 14 over substrate 18 at a suitable speed. In one embodiment, following the initial bump formation at a starting point, beam 14 is translated at a speed in the range of about 0.5 mm/s to about 2 mm/s to form a raised ridge following any desired path.

Figure 6:
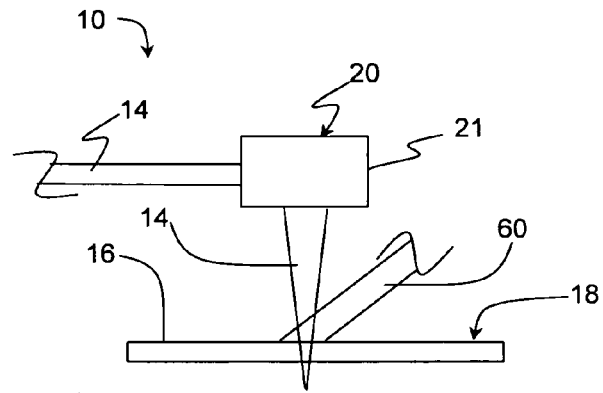
FIG. 6 is a schematic illustration of one embodiment of an exemplary system having a secondary heating source for forming raised features on a transparent substrate according to the invention.

Referring to FIG. 6, in one embodiment, additional heating of substrate 18 is provided to accelerate growth of raised feature 30. In one embodiment, additional heating of substrate 18 is provided by a secondary heat source 60. In one embodiment, the secondary heat source 60 is laser radiation. In one implementation, the laser radiation is provided by a $CO_2$ laser of moderate power (e.g., about 10 W) and having a large spot (e.g., in the range of about 3 mm to about 5 mm).

Parameters affecting raised feature formation and the resulting raised feature characteristics (both physical and optical) lie primarily with the composition of substrate 18 (e.g., thermo-mechanical properties, presence of elements suitable for the creation of photo-induced absorption at wavelengths interest, and the like), the size of beam spot 22 on surface 16, the wavelength and power density of processing light beam 14, and the duration of the irradiation exposure. Raised features 30 having various sizes, shapes and optical characteristics can be formed by varying one or more of these factors, alone or in combination. For example, a significant range of bump diameters, curvatures, and heights can be achieved. The curvature of a bump is related to its height and diameter. Thus, a wide range of raised features 30 can be obtained by varying exposure time, power of processing light source 12, and/or diameter of processing light beam 14. In embodiments according to the invention, bump diameters vary from less than about 10 µm to about 1000 µm (1 mm); curvatures vary from about 10 µm to about 1 mm; and heights vary from about 10 µm to about 150 µm or more.

In one embodiment, substrate 18 has a coefficient of thermal expansion (CTE) in the range from about 30 to about 120. In one embodiment, substrate 18 has an annealing point less than about 900° C. In one embodiment, substrate 18 has an annealing point in the range from about 500° C. to about 800° C. In one embodiment, absorption by substrate 18 at the processing light beam wavelength upon initial exposure to processing light beam 14 is less than about 20%. In one embodiment, absorption by substrate 18 at the processing light beam wavelength after exposure to processing light beam 14 is greater than about 40%, and in one embodiment greater about 50%.

In some embodiments, characteristics of raised features 30 are controlled or varied during the forming process for a single raised feature 30, for example, by adjusting the intensity of processing light beam 14, the size, location, and/or shape of beam spot 22, and/or the irradiation duration as raised feature 30 is being formed. Additionally, in some embodiments, parameters of raised features 30 are modified by additional or secondary exposure of the substrate to processing light beam 14. For example, complex profiles of raised features 30 can be formed by first fabricating a relatively large diameter bump, followed by forming one or more smaller-diameter bumps on the larger earlier-formed bump.

Figure 7:
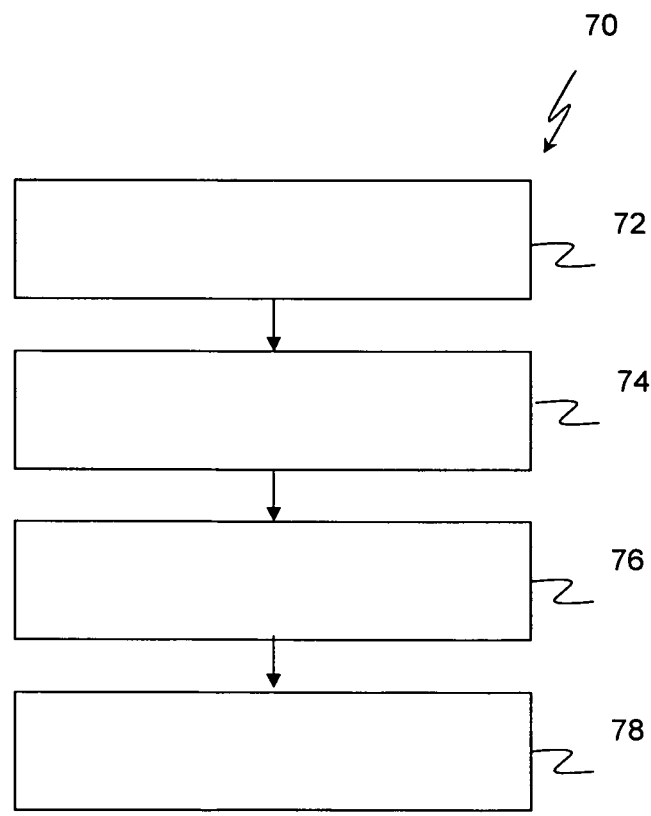
FIG. 7 is a block diagram illustrating one embodiment of a method for forming raised features on a transparent substrate according to the invention.

One embodiment of a method of forming a raised feature according to the present invention is depicted in FIG. 7 and generally depicted by reference number 70. The method includes a first step 72 defined by providing a glass transparent substrate having an absorption of less than about 20% within a processing wavelength range of a processing light beam. A second step 74 is defined by irradiating a portion of the transparent substrate with the processing light beam to increase the absorption of the irradiated portion of the substrate in the processing wavelength range by photo-induced absorption. A third step 76 is defined by irradiation of the portion of the substrate to cause local heating and expansion of the substrate so as to form a raised feature on the substrate surface. A fourth step 78 is defined by terminating the irradiation to stop heating of the substrate so as to fix the raised feature.

Figure 8:
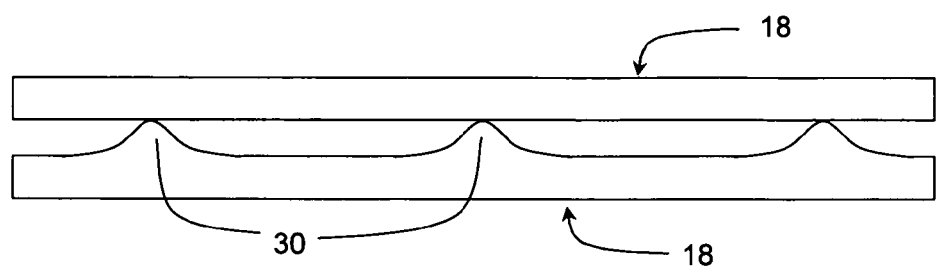
FIG. 8 is a schematic illustration of raised features used to maintain spacing between two substrates.
Figure 9:
FIG. 9 is a photograph of a plurality of raised features modifying the surface topography of a transparent substrate.
Figure 10:
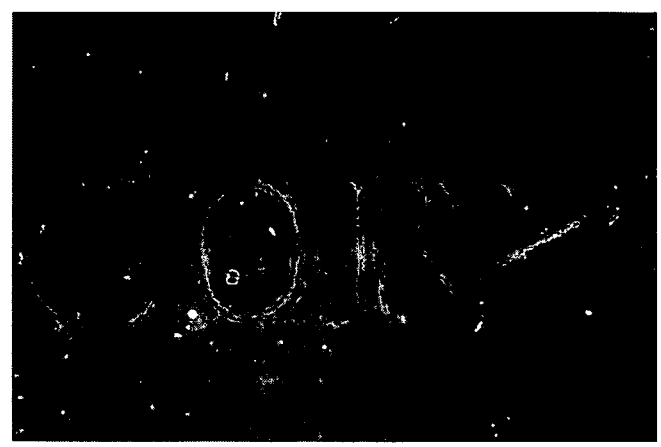
FIG. 10 is a photograph of a raised features forming text on a surface of a transparent substrate.

Raised features 30 on transparent glass substrates fabricated according to the methods disclosed herein have multiple beneficial applications. Upon initial formation, the shape of raised feature 30 generally approximates a spherical surface since the formation process is related to droplet formation. Thus, in one embodiment, raised feature 30 is a microbump that may function as a refractive microlens for light in an optical system. If beam 14 is translated at a suitable speed across substrate 18 during the formation of raised feature 30, the initial microbump may be elongated to form a ridge. In one embodiment, a ridge so formed approximates a cylindrical surface. Various combinations of bumps and ridges so formed may be used in numerous applications. For example, in some embodiments, raised features 30 (in the form of ridges, bumps, or combinations thereof) serve as spacers (FIG. 8). In other embodiments, raised features modify the surface topography of a substrate (FIG. 9) for purposes such a providing tactile features on a surface (e.g., touch-screen devices for the blind), increasing the efficiency of solar cells or OLED displays via light scattering and/or trapping caused by the raised features, or marking transparent substrates for any desired purposes. Raised features as formed herein may be used to form decorative or ornamental features on a transparent substrate, including but not limited to designs, logos, symbols, signs, emblems, insignia, text, and the like (FIG. 10).

From the description provided herein, it will be apparent that any desired arrangement of microlenses may be achieved using the described methods and processes. For example, in one embodiment, microlenses may be formed on both sides of substrate 18, so as to form a double-sided microlens. Further, it will be apparent from this description that microlenses so formed may be further processed, such as by additional processing using the same or different processing light source parameters, by micro-molding microlenses to produce aspherical shapes, and the like. It will further be realized upon reading this disclosure that microlens formation can occur in a vacuum or in an atmosphere selected for influencing the cooling rate and/or other parameters of the molten substrate material.

EXAMPLES

Aspects of the invention will be further understood and clarified by the following examples.

Example 1

Using the setup of FIG. 2, an AVIA™ 355-20 laser operating at 355 nm (available from Coherent, Inc. of Santa Clara, Calif., U.S.A) was directed onto a transparent substrate of alkaline earth aluminosilicate glass (i.e., Eagle XG™ glass available from Corning Incorporated) having a thickness of 0.67 mm. At the 355 nm wavelength of the laser, the substrate initially had absorption of approximately 15%. The laser source power was varied from about 3 W to about 7 W with a repetition rate ranging from about 30 kHz to about 50 kHz of 10 ns length pulses, and an exposure time of about 1 second. The beam delivery was accomplished with a laser scanner having a telecentric lens with a focal length of 150 mm. The beam diameter at the input of the scanner was about 1 mm. The raised feature was formed on the front surface of the substrate. The raised feature (i.e., bump) height was controllable as a function of the distance between the beam focal point and the back surface of the substrate, and the duration of the exposure. The tallest bump obtained by varying these conditions was 53.3 µm.

Example 2

For the formation of raised features on soda-lime glass having a thickness of about 3 mm, the 355-nm output beam from the AVIA™ 355-20 laser was focused onto the transparent substrate with an F=20 mm lens. The influential parameters were the laser mean power and the exposure time. Larger exposure times and higher laser power resulted in taller bumps. The maximum bump height achieved was 167 µm. The exposure time varied between 2 and 2.5 s. The irradiation parameters used to form the raised features are summarized in Table 1.

TABLE 1

| Repetition Rate, kHz | Laser Power, Watts | Exposure Time, Seconds | Bump Height, µm |
| --- | --- | --- | --- |
| 50 | 11.4 | 2 | 144.5 |
| 100 | 11.5 | 2 | 146 |
| 150 | 13 | 2.5 | 167 |
| 200 | 8 | 2 | 116 |

Example 3

The formation of raised features on sodium aluminosilicate glass (available under the trade designation 1317 glass from Corning Incorporated) was also demonstrated. The sample of sodium aluminosilicate glass was 1.3-mm thick and had not yet undergone an ion exchange surface treatment. The irradiation configuration was as shown in FIG. 6, with 150-kHz, 7-W output from the 355-nm laser focused on the substrate. After a 2 second exposure, a 167-µm bump was formed having a generally spherical shape. Notably, the magnitude of the raised feature is about 13% of the substrate thickness.

The above-described the process enables laser-induced swelling in a variety of glass compositions, and specifically enables formation of raised features on transparent glass substrates by laser-generating absorbing defects in the substrate. It will be apparent to those skilled in the art that various modifications and variations can be made without departing from the spirit and scope of the invention. For example, depending on the specific characteristics of the glass, the irradiating treatment schedule and geometry can be altered according to and beyond of what was described above. Thus it is intended that the present invention cover the modifications and variations of this invention provided they come within the scope of the appended claims and their equivalents.

What is claimed is:
1. A method for forming a raised feature on a transparent substrate, the method comprising the steps of:
   providing a transparent substrate having a surface, the substrate having an absorption of less than about 20% within a processing wavelength range;
   irradiating a portion of the transparent substrate with a processing light beam within the processing wavelength range for at least one second to increase the absorption of the irradiated portion of the substrate in the processing wavelength range;

continuing to irradiate the portion of the transparent substrate within the processing wavelength range to cause local heating and expansion of the substrate so as to form a raised feature on the substrate surface; and terminating the irradiation to stop heating of the substrate so as to fix the raised feature.

2. The method of claim 1, wherein irradiating a portion of the transparent substrate with a processing light beam to increase the absorption of the irradiated portion of the substrate in the processing wavelength range includes generating photo-induced absorption within the processing wavelength range in the irradiated portion of the substrate.

3. The method of claim 2, wherein generating photo-induced absorption comprises changing the oxidation state of ions in the substrate within the irradiated portion.

4. The method of claim 3, wherein changing the oxidation state of ions in the substrate within the irradiated portion comprises changing the oxidation state of ions that do not absorb in a visible wavelength.

5. The method of claim 2, wherein generating photo-induced absorption comprises causing light absorbing defects in the substrate within the irradiated portion.

6. The method of claim 1, wherein the transparent substrate comprises one of alkaline earth aluminosilicate glass, soda-lime glass, and sodium aluminosilicate glass.

7. The method of claim 1, wherein the transparent substrate includes therein at least one of antimony (Sb), arsenic (As), tin (Sn), iron (Fe), cerium (Ce), lead (Pb), transition metals, and oxides thereof.

8. The method of claim 1, wherein the transparent substrate has a coefficient of thermal expansion between about 30 and about 120.

9. The method of claim 1, wherein the transparent substrate has an annealing point less than about 900° C.

10. The method of claim 1, wherein the processing light beam comprises one of an ultraviolet wavelength, a near-ultraviolet wavelength, a near-infrared wavelength, and an infrared wavelength.

11. The method of claim 10, wherein the processing light beam comprises a wavelength less than about 380 nm.

12. The method of claim 1, wherein continuing to irradiate the portion of the transparent substrate within the processing wavelength range comprises continuing to irradiate the portion of the transparent substrate with the processing light beam.

13. The method of claim 1, wherein irradiating a portion of the transparent substrate with a processing light beam within the processing wavelength range comprises irradiating the portion of the transparent substrate with a first processing light beam having a first wavelength; and wherein continuing to irradiate the portion of the transparent substrate within the processing wavelength range comprises irradiating the portion with a second processing light beam having a second wavelength.

14. A method for forming a raised feature on a transparent substrate, the method comprising the steps of:

providing a transparent substrate having a surface, the substrate having an absorption of less than about 20% within a first wavelength range;

irradiating a portion of the transparent substrate with light within the first wavelength range for at least one second to increase absorption within the irradiated portion of the transparent substrate to greater than about 40% within a second wavelength range;

irradiating the portion of the transparent substrate with light within the second wavelength range to cause local heating and expansion of the substrate so as to form a raised feature on the substrate surface; and terminating the irradiating to stop heating of the substrate so as to fix the raised feature.

15. The method of claim 14, wherein the first wavelength range and the second wavelength range at least partially overlap.

16. The method of claim 14, wherein the first wavelength range and the second wavelength range do not overlap.

* * * * *